UNITED STATES PATENT OFFICE.

HENRICH REIMANN, OF HARTFORD, CONNECTICUT.

IMPROVEMENT IN CIGAR-LIGHTING CINDERS.

Specification forming part of Letters Patent No. 19,717, dated March 23, 1858.

*To all whom it may concern:*

Be it known that I, HENRICH REIMANN, of the city of Hartford, county of Hartford, and State of Connecticut, have invented a new and useful article called "Cigar-Lighting Cinders;" and I do hereby declare that the following is a correct description of the same.

The nature of my invention consists of various ingredients made into a small cake or pellet for lighting cigars.

To enable others skilled in the art to make and use my invention, I will proceed to describe the ingredients and the method of making and using the same.

The ingredients are as follows: Preparation first, twelve parts pulverized charcoal, six parts niter, two parts wheat-flour; preparation second, four parts phosphorus, six parts calcined plaster, six parts gum-arabic, two parts gunpowder.

The first preparation is to be mixed and made as follows: Boil the flour in sixty quarts of water, to produce a consistence to thick cream, pulverize the charcoal and niter, and mix with the flour and water, to make a soft kind of dough.

The second preparation is to be made as follows: Dissolve the gum-arabic in water, also the phosphorus, and mix in the plaster, then add the gunpowder, making the whole into the consistence of rich cream.

The first preparation I make the body part of the cinder for lighting. The second preparation I make use of to impregnate the top part of the body, which causes it to be instantly ignited when passing under a friction-rubber in a box prepared for the purpose when required for use.

The utility of this article is that it can be more conveniently carried and used than a lucifer-match, and especially economical; it burns up clean, and leaves no refuse to be dangerous, like a match.

What I claim as my invention, and desire to secure by Letters Patent, is—

The cigar-lighting cinders compounded and formed as herein described, and for the purpose set forth.

H. REIMANN.

Witnesses:
 WM. VINE,
 GEO. S. GILMAN.